(12) United States Patent
Ikuta et al.

(10) Patent No.: US 6,272,814 B1
(45) Date of Patent: Aug. 14, 2001

(54) METHOD OF PACKAGING NUT ASSEMBLIES

(75) Inventors: Kazuichi Ikuta; Saburo Miyamoto, both of Osaka (JP)

(73) Assignee: Wakai & Co., Ltd., Osaka (JP)

( * ) Notice: Subject to any disclaimer, the term of this patent is extended or adjusted under 35 U.S.C. 154(b) by 0 days.

(21) Appl. No.: 09/625,491

(22) Filed: Jul. 25, 2000

(30) Foreign Application Priority Data

Nov. 22, 1999 (JP) .................................................. 11-331451

(51) Int. Cl.⁷ .............................. B65B 1/04; B65D 85/24
(52) U.S. Cl. ........................... 53/473; 206/338; 206/523
(58) Field of Search .................................... 206/338, 340, 206/341, 523, 564, 591–594; 53/473, 475; 411/383, 432, 442, 469

(56) References Cited

U.S. PATENT DOCUMENTS

| 4,173,286 | * | 11/1979 | Stanko ................................. | 206/523 |
| 4,640,418 | * | 2/1987 | Lowry .................................. | 206/523 |
| 5,040,678 | * | 8/1991 | Lenmark, Sr. et al. ............... | 206/523 |
| 5,320,223 | * | 6/1994 | Allen .................................... | 206/523 |

FOREIGN PATENT DOCUMENTS

2615831 * 12/1988 (FR) ..................................... 206/523

* cited by examiner

Primary Examiner—Luan K. Bui
(74) Attorney, Agent, or Firm—Wenderoth, Lind & Ponack, L.L.P.

(57) ABSTRACT

A method of packaging a plurality of nut assemblies. Each nut assembly includes a flat head formed with a bolt hole, a pair of elongated flat arms extending parallel to each other in one direction from both sides of the head and each formed with a longitudinally elongated hole, and a nut substantially in the shape of a square pole having first and second opposed pairs of longitudinal sides and formed with pins protruding laterally through the first opposed pair of longitudinal sides and loosely received in the respective elongated holes of the arms so that the nut is pivotable about the pins relative to the arms. The nut is further formed with a threaded hole extending therethrough between the second opposed pair of longitudinal sides. To package such nut assemblies, a resilient package formed with elongated grooves having a width smaller than the distance between the second opposed pair of longitudinal sides of the nut is prepared, and a plurality of nut assemblies are pushed into the grooves of the package. The nut assemblies can thus be packaged in an orderly manner without getting tangled with each other.

1 Claim, 3 Drawing Sheets

METHOD OF PACKAGING NUT ASSEMBLIES

BACKGROUND OF THE INVENTION

This invention relates to a method of packaging nut assemblies of a type used to secure an article by means of a bolt to a flat article arranged such that its back is not accessible, and a package used for this purpose.

A hollow nut assembly of this type is shown in FIGS. 2A–3C. It comprises a flat head 3 formed with a bolt hole 2, a pair of elongated flat arms 5 extending parallel to each other in one direction from both sides of the head 3 and each formed with a longitudinally elongated hole 4, and a nut 8 substantially in the shape of a square pole having four longitudinal sides. A pair of pins 6 protrude laterally from a first pair of opposed longitudinal sides of the nut 8 and are loosely received in the respective elongated holes 4 of the arms 5 so that the nut 8 is pivotable about the pins 6 relative to the arms 5.

The arms 5 have lugs 10 at the distal ends thereof. The nut 8 has lugs 9 adapted to abut the lugs 10 when the nut longitudinally aligns with the arms 5 to prevent the nut 8 from pivoting in one direction from this position while allowing it to pivot only in the opposite direction. The nut 8 is formed with a threaded hole 7 extending therethrough between the second pair of opposed longitudinal sides. The nut 8 is further formed with an inclined guide surface 12 arranged such that when a bolt 11 is inserted through the bolt hole 2 with the lugs 9 and 10 in abutment with each other, it slides on the guide surface 12 while pivoting the nut 8 in the opposite direction until it becomes perpendicular to the axis of the arms 5 and its threaded hole 7 aligns with the bolt hole 2.

FIGS. 3A–3C show how this nut assembly is used to secure an article C with a bolt 11 to a board A whose back is inaccessible. First, as shown in FIG. 3A, a starting hole B is formed in the board A, the hole being of such a size that with the lugs 9 and 10 in abutment with each other, the nut 8 and the arms 5 can pass therethrough but not the head 3. The nut assembly is inserted into the hole B with the lugs 9 and 10 in abutment with each other until the head 3 abuts the edge of the hole B. Then, with an article C to be fastened to the board A pressed against the head 3, a bolt 11 is inserted through a hole D of the article C and the hole B. When it is slid along the guide surface 12, the nut 8 will pivot about the pins 6 by 90 degrees and become perpendicular to the axis of the arms 2 as shown in FIG. 3B.

In this state, the threaded hole 7 of the nut 8 aligns with the bolt hole 2. Thus, as the bolt 11 is turned by a screwdriver E in this state, it will thread into the threaded hole 7 while pulling the nut 8 toward the head 3 until the nut is pressed against the back of the board A as shown in FIG. 3C. The article C is now fastened to the board A.

Heretofore, a plurality of such nuts were simply put in a bag or a box for storage in a random manner.

But since the nuts 8 are freely pivotable about the pins 6, such nut assemblies frequently "get tangled" with each other in the bag or box.

Once they get tangled with each other, it is difficult to separate them without deforming or destroying the arms 5.

One solution to this problem would be to wind an adhesive tape around each nut assembly with the nut 8 aligned with the arms 5. But sticking and unsticking an adhesive tape is troublesome and time-consuming.

An object of the invention is to provide a method of easily packaging a plurality of nut assemblies of the abovementioned type in an orderly manner such that they would not tangle with each other, and to provide a package used in this method.

SUMMARY OF THE INVENTION

According to the present invention, there is provided a method of packaging a plurality of nut assemblies each comprising a flat head formed with a bolt hole, a pair of elongated arms extending parallel to each other in one direction from both sides of the head and each formed with a longitudinally elongated hole, a nut substantially in the shape of a square pole having first and second opposed pairs of longitudinal sides, and a pair of pins protruding laterally through the first opposed pair of longitudinal sides of the nut and loosely received in the elongated holes of the arms so that the nut is pivotable about the pins relative to the arms, the nut being further formed with a threaded hole extending therethrough between the second opposed pair of longitudinal sides of the nut, the method comprising preparing a resilient package formed with elongated grooves having a width smaller than the distance between the second opposed pair of longitudinal sides of the nut, and pushing each of the plurality of nut assemblies into each of the grooves with the second opposed pair of longitudinal sides facing the longitudinal walls of each of the grooves.

Other features and objects of the present invention will become apparent from the following description made with reference to the accompanying drawings, in which:

DETAILED DESCRIPTION OF THE PREFERRED EMBODIMENT

Figure 1:
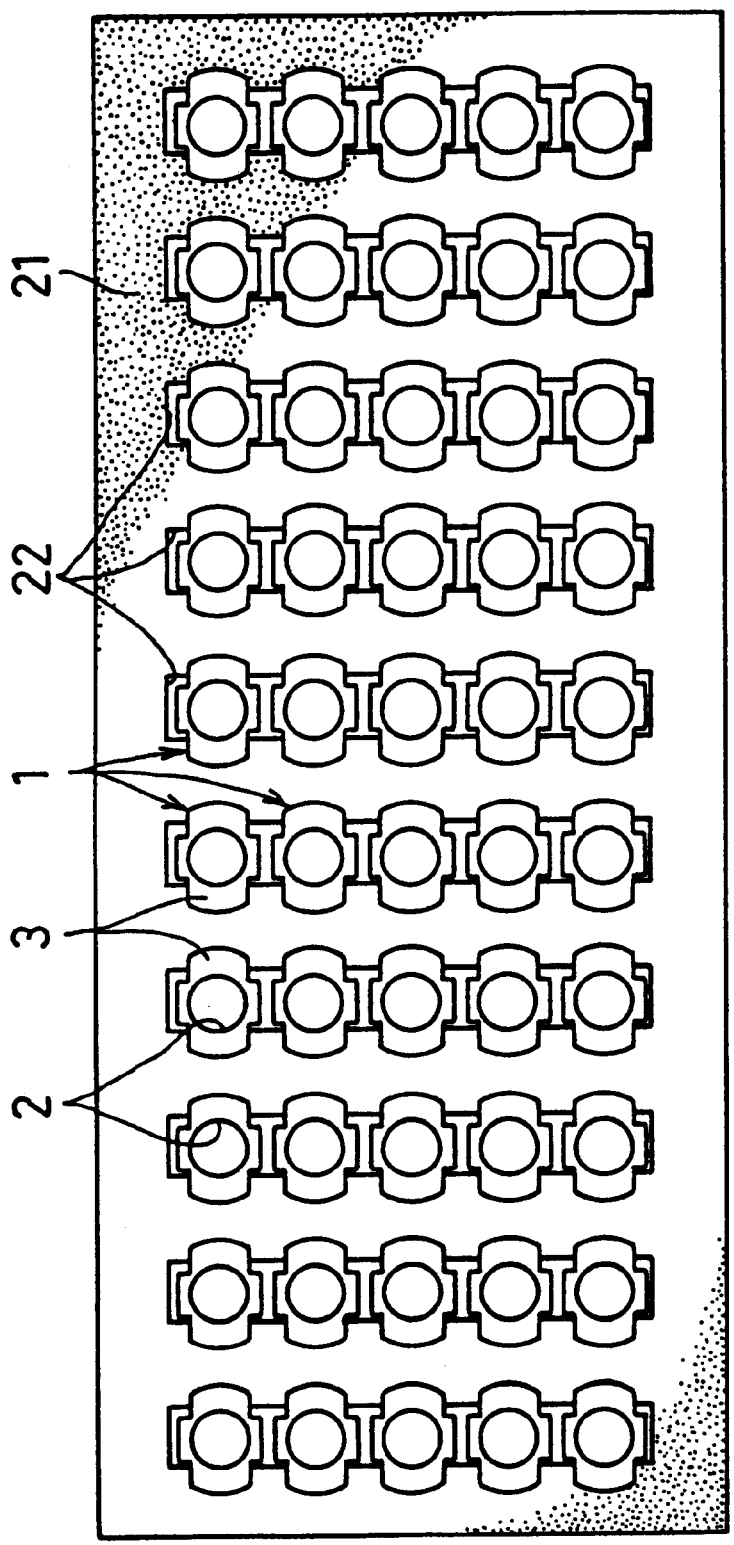
FIG. 1 is a plan view of a package for packaging a plurality of nut assembly.
Figure 2A:
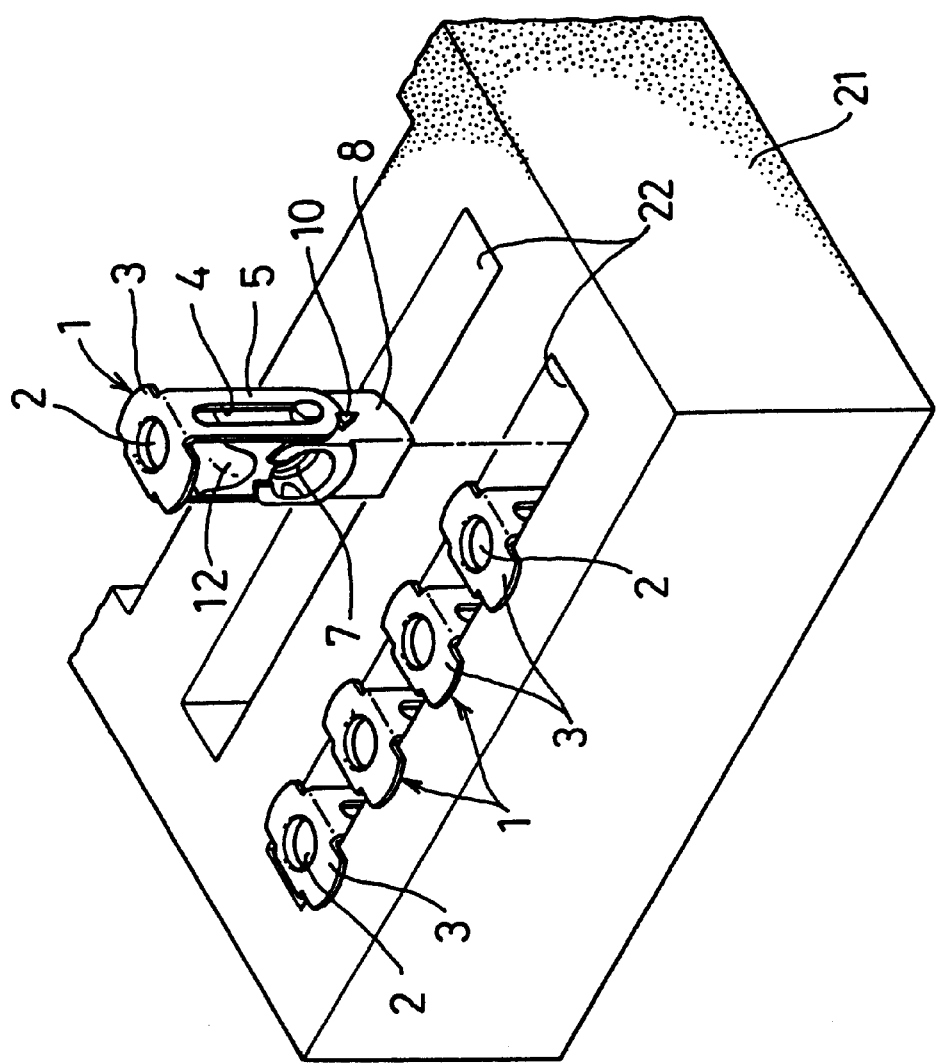
FIG. 2A is a partial perspective view of the package of FIG. 1, showing how a nut assembly is pushed into a groove of the package.

FIGS. 1 and 2 show how nut assemblies of the above-described type are packaged by a method according to the invention in a package embodying the invention.

The package 21 is a substantially rectangular thick plate made of a resilient material such as styrol foam and formed with a plurality of elongated rectangular grooves 22 extending transversely of the package and arranged side by side with each other in the longitudinal direction of the package to contain a plurality of nut assemblies. The package 21 has a thickness equal to or greater than the length of the nut assembly when the nut 8 and the arms 5 are aligned with each other. The number of grooves 22 and how they are arranged are not limited.

Figure 2B:
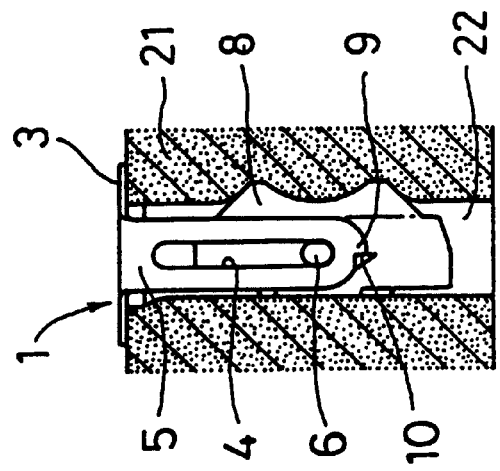
FIG. 2B is a sectional view of a nut assembly when pushed completely into a groove of the package of FIG. 1.
Figure 3A:
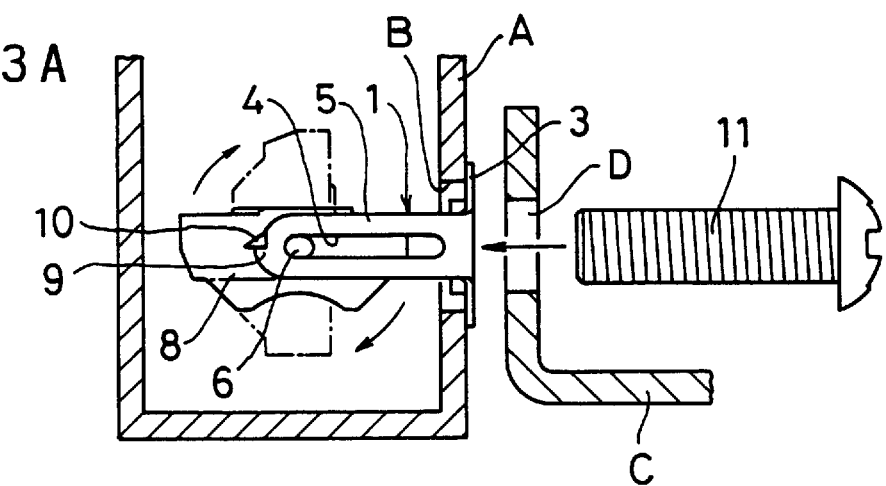
FIGS. 3A–3C illustrate how the nut assembly is used to fasten an article to a board.
Figure 3B:
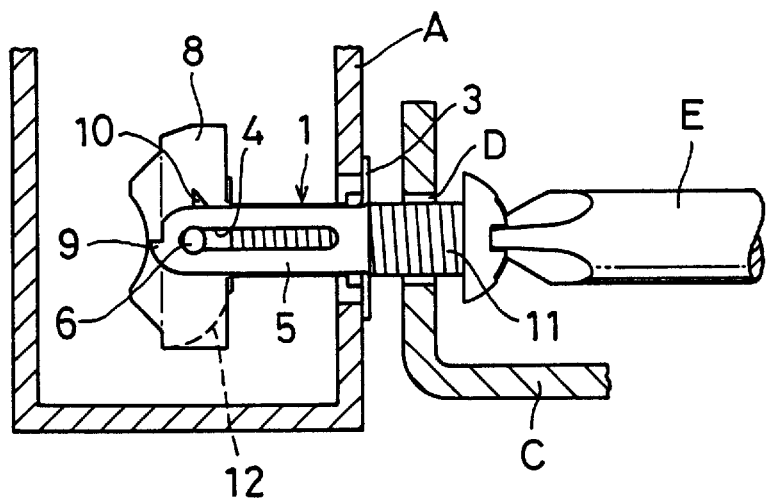
Figure 3C:
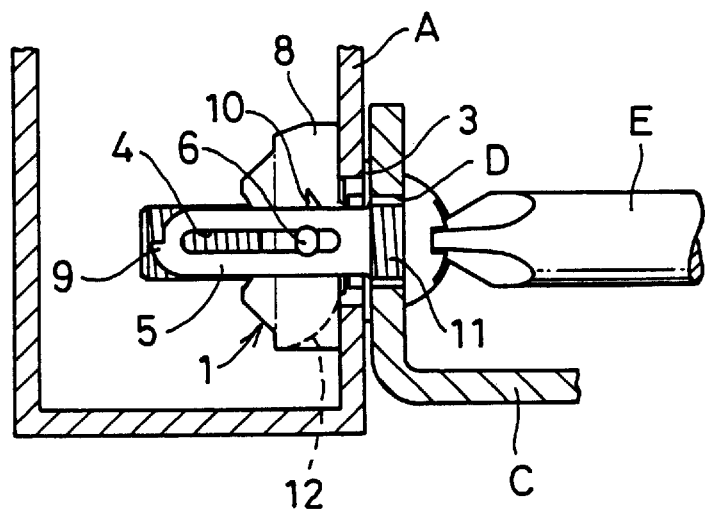

The grooves 22 have a width smaller than the maximum thickness of the nut 8, i.e. the maximum distance between the above-described second pair of opposed longitudinal sides of the nut 8, in which the threaded hole 7 is formed, so that each nut assembly 1 can be pressed into the groove 22 with the ends of the threaded hole 7 facing the longitudinal sides of the groove 22 as shown in FIG. 2B. The grooves 22 may have their bottoms open as shown in FIG. 2B or closed.

When this nut assembly 1 is inserted into a groove 22 with the second pair of opposed longitudinal sides of the nut facing the longitudinal side walls of the groove 22, the longitudinal walls are deformed by the nut 8. Thus, when the nut assembly has been pressed into the groove 22 until the head 3 abuts the surface of the package 21, the nut assembly is resiliently retained by the side walls of the groove 22 by the resilience of the styrofoam.

Since the head 3 has a length substantially greater than the width of the grooves 22, a plurality of nut assemblies can be arranged in an orderly manner with their heads flush with each other as shown in FIG. 1 simply by pushing them into the grooves 22 until their heads abut the surface of the package.

To use the nut assemblies, they can be removed from the package 21 simply by grasping their heads 3 and pulling them up.

If the grooves 22 are open-bottomed, the nut assemblies may be removed from the package by inserting a finger into the groove 22 from their bottom and pushing them up to make it easier to pull them up.

A plurality of nut assemblies 1 can thus be packaged easily in an orderly manner without the possibility of getting tangled with each other or the arms becoming deformed.

For packaging, the nut assemblies have only to be pushed into the groove. When using them, they have only to be pulled out of the groove. Thus they can be easily packaged and removed into and out of the groove.

What is claimed is:

1. A method of packaging a plurality of nut assemblies each comprising a flat head formed with a bolt hole, a pair of elongated arms extending parallel to each other in one direction from both sides of said head and each formed with a longitudinally elongated hole, a nut substantially in the shape of a square pole having first and second opposed pairs of longitudinal sides, and a pair of pins protruding laterally through said first opposed pair of longitudinal sides of said nut and loosely received in said elongated holes of said arms so that said nut is pivotable about said pins relative to said arms, said nut being further formed with a threaded hole extending therethrough between said second opposed pair of longitudinal sides of said nut, said method comprising preparing a resilient package formed with elongated grooves having a width smaller than the distance between said second opposed pair of longitudinal sides of said nut, and pushing each of said plurality of nut assemblies into each of said grooves with said second opposed pair of longitudinal sides facing the longitudinal walls of each of said grooves.

* * * * *